(12) United States Patent
Bizoara

(10) Patent No.: US 12,361,372 B2
(45) Date of Patent: Jul. 15, 2025

(54) METHODS AND SYSTEMS OF ESTIMATING LOCATION OF AN ASSET WITHIN MATERIAL HANDLING ENVIRONMENT

(71) Applicant: Hand Held Products, Inc., Charlotte, NC (US)

(72) Inventor: Manjul Bizoara, Charlotte, NC (US)

(73) Assignee: Hand Held Products, Inc., Charlotte, NC (US)

(*) Notice: Subject to any disclaimer, the term of this patent is extended or adjusted under 35 U.S.C. 154(b) by 422 days.

(21) Appl. No.: 17/372,835

(22) Filed: Jul. 12, 2021

(65) Prior Publication Data

US 2023/0020685 A1    Jan. 19, 2023

(51) Int. Cl.

| | |
|---|---|
| *G06Q 10/087* | (2023.01) |
| *G01S 13/87* | (2006.01) |
| *G06K 7/10* | (2006.01) |
| *G06N 20/00* | (2019.01) |
| *G06Q 10/08* | (2024.01) |

(Continued)

(52) U.S. Cl.
CPC .......... *G06Q 10/087* (2013.01); *G01S 13/878* (2013.01); *G06K 7/10405* (2013.01); *G06N 20/00* (2019.01); *G06Q 10/08* (2013.01); *H04W 4/33* (2018.02); *H04W 4/38* (2018.02)

(58) Field of Classification Search
USPC .......................................................... 705/22
See application file for complete search history.

(56) References Cited

U.S. PATENT DOCUMENTS

| | | | |
|---|---|---|---|
| 10,969,469 B2 | 4/2021 | Kuzbari et al. | |
| 2009/0216438 A1* | 8/2009 | Shafer | G01C 21/206 |
| | | | 701/414 |
| 2014/0062792 A1 | 3/2014 | Schantz et al. | |

(Continued)

FOREIGN PATENT DOCUMENTS

| | | | | |
|---|---|---|---|---|
| CN | 110691981 A | * | 1/2020 | ............ G01S 13/82 |
| CN | 111323747 A | | 6/2020 | |

(Continued)

OTHER PUBLICATIONS

Extended European Search Report for EP Application No. 22180824.9 dated Dec. 6, 2022 (9 pages).

(Continued)

*Primary Examiner* — Luna Champagne
(74) *Attorney, Agent, or Firm* — Alston & Bird LLP

(57) ABSTRACT

Various embodiments disclose a method for tracking assets. Method includes determining one or more locations of an asset within an indoor environment based on metadata associated an RF signal received from an RF tag associated with the asset. The method further includes identifying a first set of locations of the one or more locations. The method further includes identifying a second set of locations of the one or more locations, wherein the second set of locations corresponds to uncalibrated locations of the asset within indoor environment. Additionally, the method includes receiving a third set of locations of the asset. Furthermore, the method includes training a machine learning (ML) model based on the first set of locations, the second set of locations, and the third set of locations, and the metadata associated with the RF signal. The ML model predicts a fourth set of locations of another asset.

21 Claims, 10 Drawing Sheets

(51) Int. Cl.
*H04W 4/33* (2018.01)
*H04W 4/38* (2018.01)

(56) References Cited

U.S. PATENT DOCUMENTS

| | | | |
|---|---|---|---|
| 2016/0039340 A1* | 2/2016 | Schantz | B60Q 9/008 340/435 |
| 2018/0032356 A1 | 2/2018 | Su et al. | |
| 2018/0321356 A1 | 11/2018 | Kulkarni et al. | |
| 2019/0138975 A1 | 5/2019 | Zuberi et al. | |
| 2020/0097690 A1 | 3/2020 | Wan et al. | |
| 2020/0302510 A1* | 9/2020 | Chachek | G06Q 30/0639 |
| 2022/0070667 A1* | 3/2022 | Victa | H04W 12/03 |

FOREIGN PATENT DOCUMENTS

| | | |
|---|---|---|
| JP | 2016-212050 A | 12/2016 |
| JP | 2019-108222 A | 7/2019 |
| JP | 2019-520568 A | 7/2019 |
| JP | 2020-515862 A | 5/2020 |
| JP | 2020-101413 A | 7/2020 |

OTHER PUBLICATIONS

English Translation of JP Notice of Allowance including Search Report dated Feb. 16, 2024 for JP Application No. 2022111069, 3 page(s).
JP Notice of Allowance, including Search Report mailed on Feb. 16, 2024 for JP Application No. 2022111069, 3 page(s).
English Translation of JP Office Action dated Oct. 12, 2023 for JP Application No. 2022111069, 3 page(s).
JP Office Action Mailed on Oct. 12, 2023 for JP Application No. 2022111069, 2 page(s).

* cited by examiner

METHODS AND SYSTEMS OF ESTIMATING LOCATION OF AN ASSET WITHIN MATERIAL HANDLING ENVIRONMENT

TECHNICAL FIELD

Example embodiments of the present disclosure relate generally to a material handling environment and, more particularly, to methods and systems of estimating location of an asset in the material handling environment.

BACKGROUND

A typical material handling environment includes one or more racks that may be configured to store assets such as, but not limited to, cartons, boxes, packages, and/or the like. In some examples, it may be required to track the locations of these assets within the material handling environment. To this end, the material handling environment may be equipped with a plurality of radio frequency (RF) beacons at predetermined locations within the material handling environment. The plurality of RF beacons may be configured to determine the locations based on signals received from the RF tags coupled with each of the assets.

BRIEF SUMMARY

Various embodiments illustrated herein disclose a method for tracking assets. The method includes determining one or more locations of an asset within an indoor environment based on metadata associated an RF signal received from an RF tag associated with the asset. The method further includes identifying a first set of locations of the one or more locations. The first set of locations correspond to calibrated locations of the asset within the indoor environment. The method further includes identifying a second set of locations of the one or more locations, wherein the second set of locations corresponds to uncalibrated locations of the asset within indoor environment. Additionally, the method includes receiving a third set of locations for the second set of locations of the asset, wherein the third set of locations correspond to calibrated location for the second set of locations. Furthermore, the method includes training a machine learning (ML) model based on the first set of locations, the second set of locations, and the third set of locations, and the metadata associated with the RF signal, wherein the ML model is configured to predict a fourth set of locations of another asset within the indoor environment.

Various embodiments illustrated herein disclose a central server for tracking assets. The central server includes a processor. Further, the central server includes a memory device communicatively coupled to the processor, the memory device comprising a set of instructions executable by a processor to determine one or more locations of an asset within an indoor environment based on metadata associated with a radio frequency (RF) signal received from an RF tag associated with the asset. The processor is further configured to identify a first set of locations of the one or more locations, wherein the first set of locations correspond to locations within the indoor environment where the RF tag on the asset is within a Line of Sight (LOS) of an RF beacon installed in the indoor environment. Additionally, the processor is configured to identify a second set of locations of the one or more locations, wherein the second set of locations corresponds to locations within the indoor environment where the RF tag on the asset is out of the LOS of the RF beacon, wherein the second set of locations correspond to uncalibrated locations of the RF tag within the indoor environment. Furthermore, the processor is configured to receive a third set of locations, wherein the third set of locations correspond to calibrated locations for the second set of locations, the processor is further configured to train a machine learning (ML) model based on the first set of locations, the second set of locations, the third set of locations, and the metadata associated with the ML model, wherein the ML model is configured to predict a fourth set of locations of another asset within the indoor environment when an RF tag on the other asset is out of LOS of the RF beacon.

Various embodiments illustrated herein a method for tracking assets. The method includes determining one or more locations of an asset within an indoor environment based on metadata associated with a radio frequency (RF) signal received from an RF tag associated with the asset, wherein the one or more locations include a first set of locations and a second set of locations, wherein the first set of locations corresponds to calibrated locations of the asset within the indoor environment, and wherein the second set of locations corresponds uncalibrated locations of the asset within the indoor environment. Further, the method includes predicting, by the processor, a third set of locations based on the first set of location and the second set of locations by utilizing a machine learning (ML) model. Additionally, the method includes predicting a location of an aisle where the asset has been stored based on the third set of locations.

The foregoing illustrative summary, as well as other exemplary objectives and/or advantages of the disclosure, and the manner in which the same may be accomplished, may be further explained in the following detailed description and its accompanying drawings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
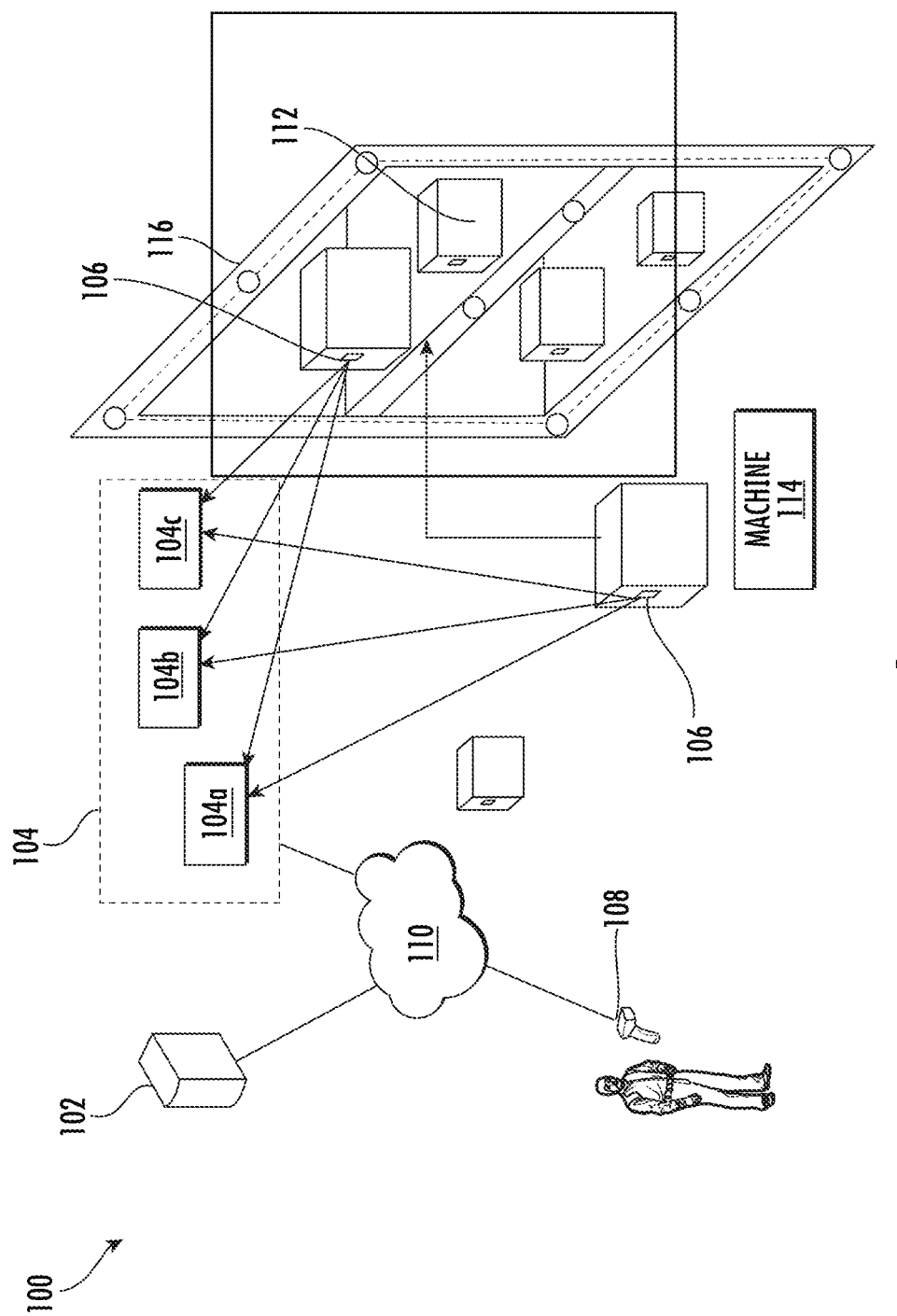
FIG. 1 illustrates an example material handling environment, according to one or more embodiments illustrated herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The term "electronically coupled," "electronically coupling," "electronically couple," "in communication with," "in electronic communication with," "communicatively coupled", or "connected" in the present disclosure refers to two or more components being connected (directly or indirectly) through wired means (for example but not limited to, system bus, wired Ethernet) and/or wireless means (for example but not limited to, Wi-Fi, Bluetooth, ZigBee), such that data and/or information may be transmitted to and/or received from these components.

The term "antenna element" is used herein to correspond to a device or an apparatus (for example, an active element) that may be configured to generate radio frequency (RF) signals when a voltage signal is applied at the antenna element. For example, the antenna element may be configured to generate RF signal in a high frequency (HF) band or a low frequency (LF) band. Additionally, or alternatively, the antenna element may generate the RF signal in the ultra-high frequency (UHF) band. Additionally, or alternatively, the antenna element may generate the RF signal in other frequency band(s). In some examples, the antenna element may further comprise a matching circuit that, for example, is electronically coupled to the active element to generate the RF signals.

The term "radio frequency (RF) tag" is used herein to correspond to an article, a device, or an apparatus that may comprise an integrated circuit (IC), an antenna element, and/or a substrate. In an example embodiment, the antenna element and the IC may be fabricated on the substrate. In an example embodiment, the IC may be communicatively coupled to the antenna element through an interconnect on the substrate. In an example embodiment, the integrated circuit in the RF tag may be configured to store encoded information or encoded data. In some examples, the RF tag may be configured to operate in one or more RF frequency bands such as, but not limited to, 3 MHz-30 MHz (the HF band), 2.4 GHz, 5 GHz, and/or 860 MHz-960 MHz (the UHF band). In some example embodiments, the RF tag may have a dedicated power source that may enable the RF tag to communicate with one or more components. Such RF tags are referred to as active RF tags. In alternative example embodiments, the RF tag may not have a dedicated power source. Such RF tags are referred to as passive RF tags. In such embodiments, the RF tag may have a power coupler that is capable of inducing electrical charge when the RF tag is brought in an RF field. The induced electrical charge may thereafter be used to power the RF tag itself.

A RF system may include one or more RF beacons. The one or more RF beacons may be configured to receive RF signals from a plurality of RF tags (placed on one or more assets) either continuously or periodically. Further, the one or more RF beacons may be configured to transmit data, obtained from the one or more RF tags, to a central server periodically. To facilitate the transmission of the data to the central server, the one or more RF beacons may be communicatively coupled to the central server through a backbone network such as, but not limited to, a wireless network, an Ethernet network, and/or the like.

The term "material handling environment" may correspond to a predefined area where an operation such as loading/unloading of articles and storage of articles is facilitated. Additionally or alternatively, the material handling environment may involve storing of the articles in one or more racks/aisles. Some examples of the material handling environment may include, but are not limited to, a warehouse, a retail outlet, and/or the like.

In general, the material handling system involves storing assets at a predetermined location for example in one or more aisles and/one or more racks. The location of the assets within the material handling environment may be tracked using one or more RF tags coupled to each of the assets. For examples, the RF tag may be configured to periodically transmit a beacon signal to one or more RF beacons installed at the predetermined locations within the material handling environment. For example, the RF tag may be configured to broadcast the beacon signal. In an example embodiment, a set of RF beacons of the one or more RF beacons may receive the beacon signal from the RF tag. In some examples, the set of RF beacons may be within Line of Sight (LOS) of the RF tag, and therefore, may receive the beacon signal from the RF tag. In another example, the set of RF beacons may receive the beacon signals after the beacon signal may have undergone one or more reflections (from one or more surfaces in the material handling environment). Such reflections of the beacon signal may be experienced when the asset is in proximity of the one or more surfaces. For example, such reflections of the beacon signals may be experienced when the asset is near an aisle and/or a rack and is about to be stored on the aisle. In another example, such reflections of the beacon signals may be experienced when the asset positioned on an aisle and/or a rack.

In some examples, the set of RF beacons may further transmit the beacon signals to the central server. In an example embodiment, the central server may be configured to determine the location of the asset based on metadata associated with the beacon signal received from the set of RF beacons using one or more location determination algorithms such as, but not limited to, triangulation method. In some examples, the metadata associated with the beacon signal may include, but not limited to, a signal strength of the beacon signal, a location of the RF beacon in the material handling environment, and/or the like. As discussed, set of RF beacons may include RF beacon that may have received the beacon signal after one or more reflections. Such RF beacons may not be in LOS of the RF tag and may still have received the beacon signal. Determining location based on the beacon signal received from such RF beacon may be inaccurate and/or uncalibrated. Accordingly, tracking an asset within the material handling environment may be prone to errors, which may further lead to loss in productivity.

Embodiments describe a material handling environment that includes the one or more RF beacons installed at the predetermined locations. The set of RF beacons of the one or more RF beacons may receive the beacon signals from the RF tag positioned on the asset. Further, the set of RF beacons may transmit the beacon signals to the central server. The central server may be configured to determine the location of the asset within the material handling environment. For example, the asset may be traversing through the material handling environment and the central server may be configured to track the location of the asset based on the beacon signals received from the RF tag on the asset through the set of RF beacons. Since, during the traversal of the asset, the set of RF beacons may be in direct LOS of the RF tag, the signal strength measured by the set of RF beacons may be accurate. Accordingly, the central server may determine accurate location of the asset within the material handling environment, when the RF tag is in LOS of the set of RF beacons. The central server may be configured to store LOS location of the asset and the metadata associated with the beacon signal transmitted by the RF tag coupled to the asset.

As the asset approaches the storage racks and/or aisles, the set of RF beacons may receive the beacon signal after multiple reflections (because of the one or more surfaces in proximity to the RF tag coupled to the asset). Accordingly, the location determined by the central server may be inaccurate and/or uncalibrated (hereinafter referred as NLOS locations). The central server may be configured to store the NLOS locations and the metadata associated with the beacon signals that were used to determine the NLOS locations.

In some examples, the central server may further receive correct locations for the NLOS locations of the asset. In an example embodiment, the central server may receive the correct locations from inertial sensors in the RF tag. Some examples of the inertial sensor may include, but not limited to, accelerometer, gyroscope, and/or the like. In another example, the central server may receive the correct locations manually from the operator that is causing the asset to traverse through the material handling environment. In another example, the central server may receive the correct locations from a mobile computer 108 attached to the operator. To this end, the mobile computer 108 may be coupled to an arm of the operator. Accordingly, when the operator moves or places the asset on the rack and/or aisle, the inertial sensors and/or GPS sensors on the mobile computer 108 may provide correct location of the asset within the material handling environment. Similarly, when the asset is being moved or traversed using a machine such as a forklift, the inertial sensors and/or GPS sensors on the forklift may provide accurate locations on the asset for the NLOS locations.

Thereafter, the central server may be configured to generate training data that includes one or more features and the one or more labels. The one or more features corresponds to expected input to the ML model and the one or more labels correspond to expected output of the ML model. To this end, the metadata associated with the beacon signals (that were used to determine the NLOS locations and LOS locations), the LOS locations, and NLOS locations correspond to the one or more features and the accurate locations correspond to the one or more labels. Thereafter, the central server may be configured to train the ML model based on the training data.

The central server may be configured to utilize the ML model to predict accurate locations of another asset within the material handling environment. For example, during the traversal of the other asset through the material handling environment, the central server may be configured to track the location of the asset based on the beacon signals received from the RF tag through the set of RF beacons. The central server may be configured to identify LOS location of the other asset and the NLOS location of the other asset. Further, the central server may be configured to determine the metadata associated with the beacon signal that is used to determine the LOS locations and the NLOS locations, respectively. Based on the LOS locations of the other asset, the NLOS locations of the other asset, and/or the metadata associated with the beacon signal, the central server may be configured to predict the correct locations corresponding to the NLOS locations of the other asset.

Predicting the correct locations using the beacon signals received from the RF tags avoid the use of the inertial sensors and/or GPS sensor in the RF tags, machine, and/or mobile computer 108. Avoiding the inertial sensors/and/or GPS sensors helps in reducing complexity of the material handling environment thereby reducing the overall cost of the operation in the material handling environment. Further, the count of sensors to be deployed in the material handling environment can drastically reduce. Further, tracking of the locations in addition to the tracking of the content stored in the RF tags can be achieved simultaneously.

FIG. 1 illustrates an example material handling environment 100, according to one or more embodiments illustrated herein. The material handling environment 100 includes a central server 102, one or more RF beacons 104, an RF tag 106 coupled to an asset 112, a mobile computer 108, a communication network 110, and a machine 114. The central server 102, the one or more RF beacons 104, the RF tag 106, the mobile computer 108, and the machine 114 are communicatively coupled with each other through the communication network 110.

The material handling environment 100 may correspond to a warehouse and/or any other space (such as an indoor environment) that is configured to store one or more assets 112. Additionally, the material handling environment 100 may allow storage of the asset 112 in one or more racks and/or aisle 116. To place the asset 112 in the one or more racks and/or aisle 116. For example, the operator may place the asset 112 manually on the one or more racks and aisles 116. In another embodiment, the machine 114 may be configured to place the asset 112 on the one or more racks and aisles 116.

The central server 102 may include suitable logic and/or circuitry that may enable the central server 102 to track the asset 112 within the material handling environment 100. In some examples, the central server 102 receives a beacon signal from the RF tag 106 on the asset 112 through a set of RF beacons (e.g., the RF beacon 104a, 104b, and 104c) of the one or more RF beacons 104. In some examples, the beacon signal corresponds to a radio frequency (RF) signal. The central server 102 may be configured to determine a location of the asset based on the beacon signal, as is described in FIG. 3. Additionally or alternatively, the central server 102 may be configured to categorize the location of the asset 112 in a first set of locations or a second set of locations. In some examples, the first set of locations may include locations that are determined when the RF tag 106 is in line of sight (LOS) of the set of RF beacons 104a and/or 104b. In some examples, the second set of locations may include locations that are determined when the RF tag 106 is outside the LOS of the set of RF beacons 104a and/or 104b. The categorization of the location of the asset 112 in the first set of locations or the second set of locations is further described in FIG. 3. In an example embodiment the central server 102 may be further configured to determine a set of accurate locations for the second set of locations, as is further described in FIG. 3. The central server 102 is further configured to train a machine learning (ML) model based on the first set of locations, the second set of locations, the set of accurate locations, and the beacons signal, as is further described in FIG. 3. Based on the ML model, the central server 102 may be configured to predict the location of another asset in the material handling environment 100, as is further described in FIG. 5. The central server 102 may be implemented on any computing device, without departing from then scope of the disclosure. The structure and the operation of the central server 102 is further described in conjunction with FIG. 2 and FIG. 3.

The one or more RF beacons 104 may include suitable logic and/or circuitry that may enable the transmission and/or reception of the data to/from of the RF tag 106 using one or more known protocols such as, but not limited to, Bluetooth™, WiFi™, 3G, 4G, 5G, 2G, CDMA, CDMA2000, RFID protocols, ZigBee, and/or any other RF based communication protocol. The one or more RF beacons 104 may include antenna element that may enable transmission/reception of the data from the RF tags 106. The one or more RF beacons 104 may be configured to receive a beacon signal from the RF tag 106. Further, the one or more RF beacons 104 may be configured to determine metadata associated with the beacon signal. Additionally or alternatively, the one or more RF beacons 104 may be configured to transmit the beacon signal to the central server 102.

The RF tag 106 includes suitable logic and/or circuitry that may enable the RF tag 106 to broadcast the beacon signal periodically using one or more known protocols such as, but not limited to, Bluetooth™, WiFi™, 3G, 4G, 5G, 2G, CDMA, CDMA2000, RFID protocols, ZigBee, and/or any other RF based communication protocol. The RF tag 106 may further include a memory unit that may be configured to store unique identification associated with the asset 112 on which the RF tag 106 is attached. In some examples, the RF tag 106 may be configured to broadcast the unique identification over the beacon signal. The RF tag 106 may further include one or more inertial sensors (not shown) such as, but not limited to, accelerometer, gyroscope, and/or the like. The RF tag 106 may be configured to modify the periodicity of the broadcasting the beacon signal based on the readings received from the one or more inertial sensors. If the readings from the one or more inertial sensor indicate that the RF tag 106 is in motion, the RF tag 106 may be configured to increase the periodicity of broadcasting the beacon signal. For example, the RF tag 106 may be configured to broadcast the beacon signal every 5 mms when the RF tag 106 is in motion (based on the measurement from the one or more inertial sensors). If the readings from the one or more inertial sensor indicate that the RF tag 106 is stationary, the RF tag 106 may be configured to decrease the periodicity of broadcasting the beacon signal. For example, the RF tag 106 may be configured to broadcast the beacon signal every 1 second when the RF tag 106 is stationary (based on the measurement from the one or more inertial sensors).

The mobile computer 108 includes suitable logic and/or circuitry that may enable the mobile computer 108 to provide instructions to the operator to perform one or more tasks in the material handling environment 100. In some examples, the mobile computer 108 includes one or more image capturing means that may be configured scan barcode printed on the asset 112 and/or the barcode on the one or more racks and/or aisle 116. The mobile computer 108 may further include the one or more inertial sensors and/or GPS sensor that may be configured to determine location data (indicating the location of the mobile computer 108 within the material handling environment 100). Further, the mobile computer 108 may be configured to transmit the location data to the central server 102. The mobile computer 108 may correspond to any electronic device that is capable of to be carried by the operator within the material handling environment 100 and is capable of capturing images.

The machine 114 may include one or more components that may cause the traversal of the asset 112 within the material handling environment 100. The machine 114 may include an engine unit that may be either electric based and/or fuel based. Additionally or alternatively, the machine 114 may include the one or more inertial sensors and/or GPS sensor that may be configured to generate the location data. Further, the machine 114 may be configured to transmit the location data to the central server 102. Some examples of the machine 114 may include, but are not limited to, conveyor, forklift, and/or the like.

The communication network 110 corresponds to a medium through which content and messages flow between various devices in the material handling environment. Examples of the communication network 110 may include, but are not limited to, a Wireless Fidelity (Wi-Fi) network, a Wireless Area Network (WAN), a Local Area Network (LAN), or a Metropolitan Area Network (MAN). Various devices in the material handling environment 100 can connect to the communication network 110 in accordance with various wired and wireless communication protocols such as Transmission Control Protocol and Internet Protocol (TCP/IP), User Datagram Protocol (UDP), and 2G, 3G, 4G, or 5G communication protocols.

Figure 2:
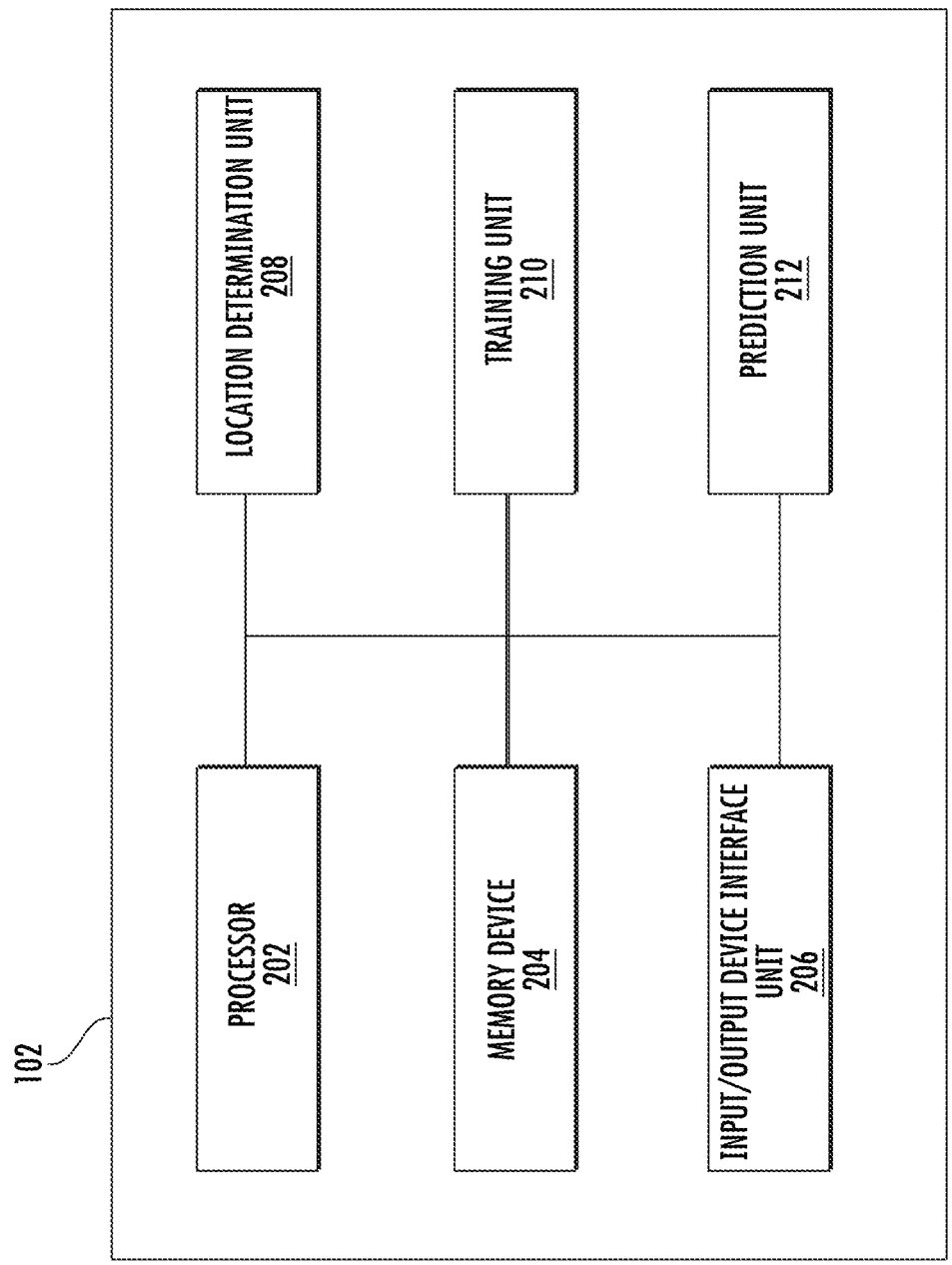
FIG. 2 illustrates a block diagram of a central server, according to one or more embodiments illustrated herein.

FIG. 2 illustrates a block diagram of the central server 102, according to one or more embodiments illustrated herein. The central server 102 includes a processor 202, a memory device 204, an Input/Output device interface unit 206, a location determination unit 208, a training unit, and a prediction unit 212.

The processor 202 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 2 as a single controller, in an example embodiment, the processor 202 may include a plurality of processors and signal processing modules. The plurality of processors may be embodied on a single electronic device or may be distributed across a plurality of electronic devices collectively configured to function as the circuitry of the central server 102. The plurality of processors may be in operative communication with each other and may be collectively configured to perform one or more functionalities of the circuitry of the central server 102, as described herein. In an example embodiment, the processor 202 may be configured to execute instructions stored in the memory device 204 or otherwise accessible to the processor 202. These instructions, when executed by the processor 202, may cause the circuitry of the central server 102 to perform one or more of the functionalities, as described herein.

Whether configured by hardware, firmware/software methods, or by a combination thereof, the processor 202 may include an entity capable of performing operations according to embodiments of the present disclosure while configured accordingly. Thus, for example, when the processor 202 is embodied as an ASIC, FPGA or the like, the processor 202 may include specifically configured hardware for conducting one or more operations described herein. Alternatively, as another example, when the processor 202 is embodied as an executor of instructions, such as may be stored in the memory device 204, the instructions may specifically configure the processor 202 to perform one or more algorithms and operations described herein.

Thus, the processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 204 may include suitable logic, circuitry, and/or interfaces that are adapted to store a set of instructions that is executable by the processor 202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory device 204 may be integrated with the processor 202 on a single chip, without departing from the scope of the disclosure.

The I/O device interface unit 206 may correspond to a communication interface that may facilitate transmission and reception of messages and data to and from various devices. Examples of the I/O device interface unit 206 may include, but are not limited to, an antenna, an Ethernet port, a USB port, a serial port, or any other port that can be adapted to receive and transmit data. The I/O device interface unit 206 transmits and receives data and/or messages in accordance with the various communication protocols, such as, Bluetooth®, Infra-Red, I2C, TCP/IP, UDP, and 2G, 3G, 4G, or 5G communication protocols.

The location determination unit 208 may include suitable logic and/or circuitry that may enable the location determination unit 208 to receive the beacon signal from the RF tag 106. Further, the location determination unit 208 may be configured to receive the metadata associated with the beacon signal, as is further described in FIG. 3. Based on the metadata associated with the beacon signal, the location determination unit 208 may be configured to determine a location of the asset 112 within the material handling environment, as is further described in FIG. 3. Further, the location determination unit 208 may be configured to generate time series data of the location of the asset 112, as is further described in FIG. 3. Further, the location determination unit 208 may be configured to categorize the locations in the time series data of the locations in the first set of locations and the second set of locations, as is further described in FIG. 3. Additionally, the location determination unit 208 may be configured to receive the location data from the mobile computer 108 and/or the machine 114, as is further described in FIG. 3. Based on the location data from the mobile computer 108 and/or the machine 114, the location determination unit 208 may be configured to determine a third set of locations for the second set of locations, as is further described in FIG. 3. In an example embodiment, the third set of locations corresponds to calibrated/accurate locations for the second set of locations. The location determination unit 208 may be implemented using one or more known technologies such as, but not limited to, Field Programmable Gate Array (FPGA) and/or Application specific integrated circuit (ASIC).

Figure 3:
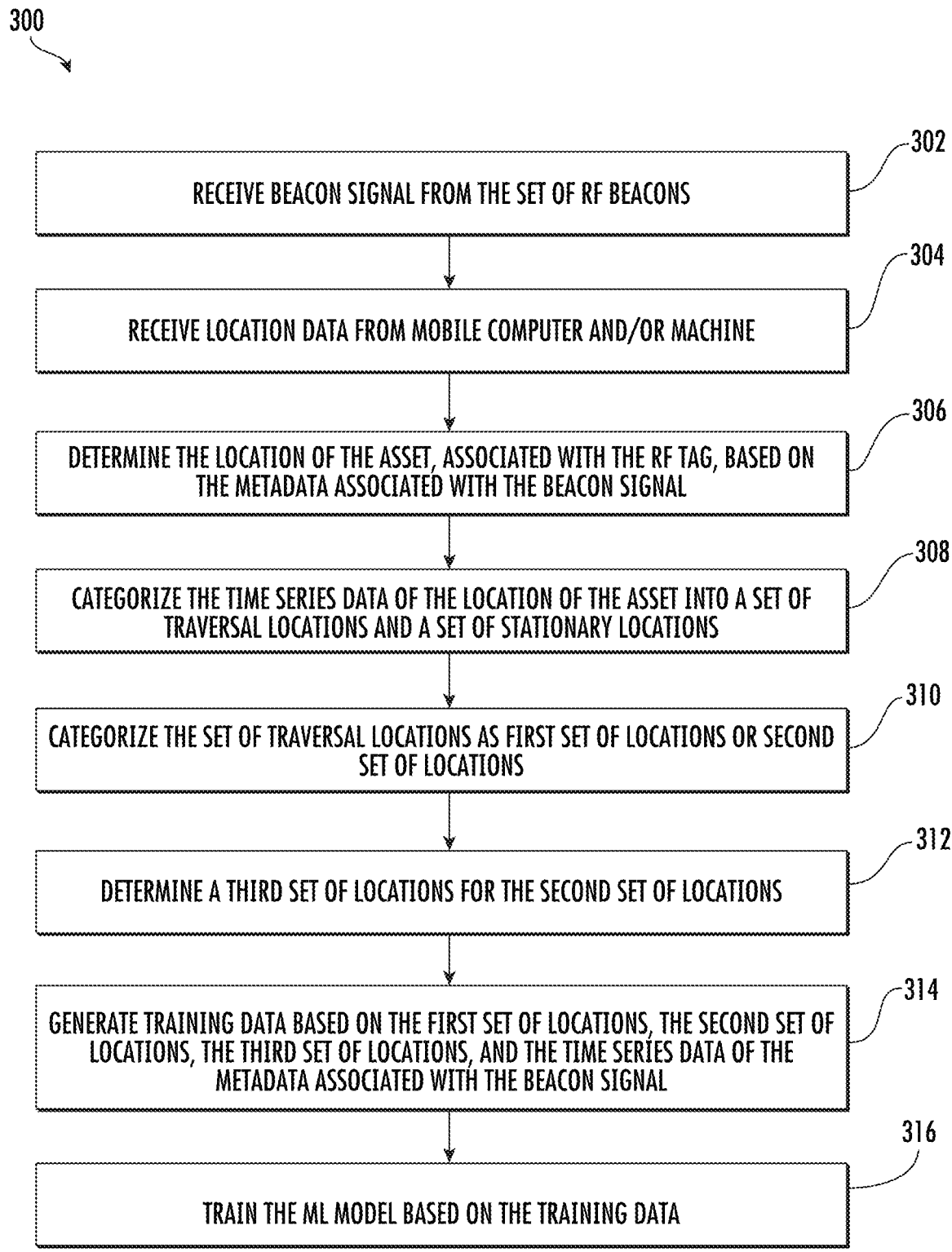
FIG. 3 illustrates a flowchart of a method for operating a central server, according to one or more embodiments illustrated herein.

The training unit 210 may include suitable logic and/or circuitry that may enable the training unit 210 to train the ML model based on the time series data of the location of the asset 112 within the material handling environment 100, the third set of locations for the second set of locations, and the metadata associated with the beacon signal, as is further described in FIG. 3. In an example embodiment, the training unit 210 may be configured to utilize one or more known methodologies to train the ML model such as, but not limited to, Logistic Regression, Naïve Bayes, Convolution Neural Network (CNN), and/or the like. The training unit 210 may be implemented using one or more known technologies such as, but not limited to, Field Programmable Gate Array (FPGA) and/or Application specific integrated circuit (ASIC). The prediction unit 212 may include suitable logic and/or circuitry that may enable the prediction unit 212 to predict a fourth set of locations for another asset 112 in the material handling environment 100. In an example embodiment, the prediction unit 212 may be configured to utilize the ML model to predict the fourth set of locations for the other asset 112 based on the time series data of the location of the other asset and the metadata associated with the beacon signal (received from the RF tag 106 associated with the other asset 112), as is further described in FIG. 5. The prediction unit 212 may be implemented using one or more known technologies such as, but not limited to, Field Programmable Gate Array (FPGA) and/or Application specific integrated circuit (ASIC).

FIG. 3 illustrates a flowchart 300 of a method for operating a central server 102, according to one or more embodiments illustrated herein.

At step 302, the central server 102 may include means such as the processor 202, the I/O device interface unit 206, and/or the like, for receiving the beacon signal from the set of RF beacons 104a and 104b. As discussed, the RF tag 106 periodically broadcasts the beacon signal that may be received by the set of RF beacons 104a and 104b that may within LOS of the RF tag 106 and/or may be outside LOS of the RF tag 106.

Additionally or alternatively, the processor 202 may be configured to determine metadata associated with the beacon signal received from the set of RF beacons 104a and 104b. In an example embodiment, the metadata associated with the beacon signal may include, but not limited to, a signal strength of the beacon signal received by each RF beacon in the set of RF beacons 104a and 104b, a unique ID of the RF beacon (through which the central server has received the beacon signal), a location of the RF beacon within the material handling environment 100, and/or the like. Since the processor 202 receives the beacon signal periodically from each RF beacon in the set of RF beacons 104a and 104b, the processor may be configured to generate a time series data of the metadata associated with the beacon signal (received from each RF beacon in the set of RF beacons 104a and 104b) for each RF beacon in the set of RF beacons 104a and 104b. In the time series data of the metadata associated with the beacon signal, the metadata associated with the beacon signal is timestamped based on the time instant at which the RF beacon receives the beacon signal. Following table illustrates an example time series data of the metadata associated with the beacon signal:

TABLE 1

Time series data of metadata associated with beacon signal

| Timestamp | Unique ID | Location of RF beacon | Signal strength (in decibels) |
|---|---|---|---|
| $T_1$ | 1a | (x1, y1, z1) | 10 Db |
| $T_2$ | 1a | (x1, y1, z1) | 3 Db |
| $T_1$ | 1b | (x2, y2, z2) | 15 Db |
| $T_1$ | 1c | (x3, y3, z3) | 20 Db |

It can be observed from table 1 that at time instant $T_1$, the RF beacon 1a, RF beacon 1b, and the RF beacon 1c receives the beacon signal. Further, the signal strength of the beacon signal received by the RF beacon 1a, RF beacon 1b, and the RF beacon 1c.

At step 304, the central server 102 may include means such as the processor 202, the I/O device interface unit 206, the location determination unit 208, and/or the like, for receiving location data from one or more mobile computers (e.g., the mobile computer 108) and/or one or more machines (for example, the machine 114) operating in the material handling environment 100. In an example embodiment, the location data may include, but is not limited to, accelerometer data, gyroscope data, and GPS data. As discussed, the mobile computer 108 may include one or more of the inertial sensors (that further includes accelerometer and gyroscope) and GPS sensor that may generate the location data. Similarly, the machine 114 operating in the material handling environment 100 includes the one or more inertial sensors and GPS sensor that may generate the location data. The processor 202 may be configured to generate time series data of the location data, received from the mobile computer 108 and/or the machine 114 operating in the material handling environment 100. To this end, the location determination unit 208 may periodically receive the location data from the mobile computer 108 and the machine 114. Further, the location data is indicative of location of the mobile computer 108 and/or the machine 114 within the material handling environment 100.

At step 306, the central server 102 may include means such as the processor 202, the I/O device interface unit 206, the location determination unit 208, and/or the like, for determining the location of the asset 112, associated with the RF tag 106, based on the metadata associated with the beacon signal received from the set of RF beacons 104a and 104b. In an example embodiment, the location determination unit 208 may be configured to utilize known methodologies to determine the location of the RF tag 106 associated with the asset 112. For example, the location determination unit 208 may be configured to utilize the triangulation methodology to determine the location of the RF tag associated with the asset 112.

To this end, the location determination unit 208 may be configured to determine the location of each RF beacon in the set of RF beacons 104a and 104b from which the processor 202 has received beacon signal. As discussed, the location of the one or more RF beacons 104 is predefined during deployment of the one or more RF beacons 104 in the material handling environment 100. In an example embodiment, the location determination unit 208 may be configured to determine the signal strength of the beacon signal received by each RF beacon in the set of RF beacons 104a and 104b (based on the time series data of the metadata associated with the beacon signal). Based on the signal strength of the beacon signal, the location determination unit 208 may be configured to estimate a distance of the RF tag 106 from the respective RF beacon (e.g., the RF beacon 104a). In an example embodiment, the location determination unit 208 may be configured to utilize inverse square relation between the distance and the signal strength to estimate the distance of the RF tag 106 from each RF beacon in the set of RF beacons 104a and 104b. Thereafter, the location determination unit 208 may be configured to define a virtual circle, for each RF beacon in the set of RF beacons 104a and 104b, with the estimated distance (of the RF tag 106 from each RF beacon in the set of RF beacons 104a and 104b) as the radius. Further, the location determination unit 208 may be configured to determine intersection points amongst the virtual circle created for RF beacon in the set of RF beacons 104a and 104b. In some examples, the determination of the intersection points may include determination of the coordinates of the intersection points within the material handling environment 100. The location determination unit 208 may be configured to determine the coordinates of the intersection point based on the location of the set of RF beacons 104a and 104b in the material handling environment 100. In some examples, the location determination unit 208 may be configured to utilize known geometrical relations to determine the coordinates of the intersection points. As discussed, the location of the set of RF beacons 104a and 104b may be predetermined during deployment of the set of RF beacons 104a and 104b in the material handling environment 100. Based on the location of the intersection points within the material handling environment 100, the location determination unit 208 may be configured to estimate the location of the RF tag 106 in the material handling environment 100. The location of the RF tag 106 in the material handling environment 100 is considered as the location of the asset 112 within the material handling environment 100.

In an example embodiment, the location determination unit 208 may be configured to determine time series data of the location of the asset 112 based on the time series data of the metadata of the beacon signal (received through the set of RF beacons 104a and 104b). More particularly, the location determination unit 208 may be configured to determine the location of the asset 112 at each time instant of reception of the beacon signal. In some examples, the time series data of the location of the asset 112 may be utilized to monitor the location of the asset 112 within the material handling environment 100. For example, the time series data of the location of the asset 112 may include locations indicating the traversal of the asset 112 through the material handling environment 100. Further the time series data of the location of the asset 112 include locations that may indicate a stationary location of the asset 112 (i.e., when the asset 112 is stored in the aisle and/or racks 116 in the material handling environment 100)

At step 308, the central server 102 may include means such as the processor 202, the I/O device interface unit 206, the location determination unit 208, and/or the like, for categorizing the time series data of the location of the asset 112 into a set of traversal locations and a set of stationary locations. The method for categorizing the time series data of the location of the asset 112 is further described in conjunction with FIG. 6 and FIG. 7.

At step 310, the central server 102 may include means such as the processor 202, the I/O device interface unit 206, the location determination unit 208, and/or the like, for categorizing the set of traversal locations as a first set of locations or a second set of locations. In an example embodiment, the first set of locations, in conjunction, may be indicative of traversal path of the asset 112 through the material handling environment 100. Further, the location determination unit 208 may have determined the first set of locations (of the set of traversal locations), while the RF tag 106 on the asset 112 is in LOS of the set of RF beacons 104a and 104b. Accordingly, the location determination unit 208 may have accurately determined the locations in the first set of locations. Hereinafter, the first set of locations have been interchangeably referred to as the set of LOS locations.

In an example embodiment, the location determination unit 208 may have determined the second set of locations (of the set of traversal locations), while the RF tag 106 on the asset 112 is outside the LOS of the set of RF beacons 104a and 104b (e.g., the asset 112 may be approaching the aisle, which may have caused reflections in the beacon signal). Accordingly, the location determination unit 208 may have inaccurately determined the locations in the second set of locations. Hereinafter, the second set of locations have been interchangeably referred to as the set of NLOS locations. The categorizing of the set of traversal locations is further described in conjunction with FIG. 8.

At step 312, the central server 102 may include means such as the processor 202, the I/O device interface unit 206, a location determination unit 208, and/or the like, for determining a third set of locations for the second set of locations. As discussed, the third set of locations correspond to the calibrated location for the second set of locations. In an example embodiment, the location determination unit 208 may be configured to determine the third set of locations for the second set of locations based on the location data received from the mobile computer 108 and/or the machine 114 operating in the material handling environment 100. In another embodiment, the location determination unit 208 may receive a manual input from the operator, where the manual input pertains to the third set of locations for the second set of locations. The determination of the third set of locations is further described in conjunction with FIG. 9.

At step 314, the central server 102 may include means such as the processor 202, the I/O device interface unit 206, a training unit 210, and/or the like, for generating training data based on the first set of locations, the second set of locations, the third set of locations, and the time series data of the metadata associated with the beacon signal (received from the RF tag 106 through the set of RF beacons 104a and 104b). In some examples, the training unit 210 may be configured to define the first set of locations, the second set of locations, and the metadata associated with the beacon signal as the one or more features in the training data. More particularly, the time series data of the metadata associated with the beacon signal (included in the training data) may include only a portion of the time series data of the metadata associated with the beacon signal instead of the complete time series data of the metadata associated with the beacon signal. In some examples, the portion of the time series data may include metadata of the beacon signal that is utilized to determine the second set of locations. In another embodiment, the training data may include the complete time series data of the metadata of the beacon signal that is utilized to determine the first set of locations and the second set of locations. As discussed, the one or more features in the training data correspond to expected input to the ML model (to be trained using the training data). Further, the training unit 210 may be configured to define the third set of locations (determined for the second set of locations) as the one or more labels in the training data. As discussed, the one or more labels correspond to the expected output of the ML model.

At step 316, the central server 102 may include means such as the processor 202, the I/O device interface unit 206, a training unit 210, and/or the like, for training the ML model based on the training data. In an example embodiment, the training unit 210 may be configured to train the ML model using one or more known methodologies such as, but not limited to, Logistic Regression, Convolution Neural Network, Keras, and/or the like.

In some examples, the scope of the disclosure is not limited to training the ML model only for the asset 112 that is traversing through the material handling environment. In an example embodiment, the training unit 210 may be configured to train another ML model for predicting the accurate location for the asset 112 stored in the aisle and/or the racks 116. As discussed, the RF tag 106 may be out of LOS when the asset 112 is stored in the aisle and/or racks 116. Accordingly, the location determined using the metadata associated with the beacon signal received from such RF tag 106 may be inaccurate. To this end, the training unit 210 may train the other ML model to enable prediction of the accurate location of the asset 112 stored in the aisle and/or racks 116. In an alternate embodiment, the training unit 210 may be configure to further train the ML model to enable the ML model to predict accurate location for the asset 112 stored in the aisle and/or the racks. One such method of further training the ML model is described in conjunction with FIG. 4.

Figure 4:
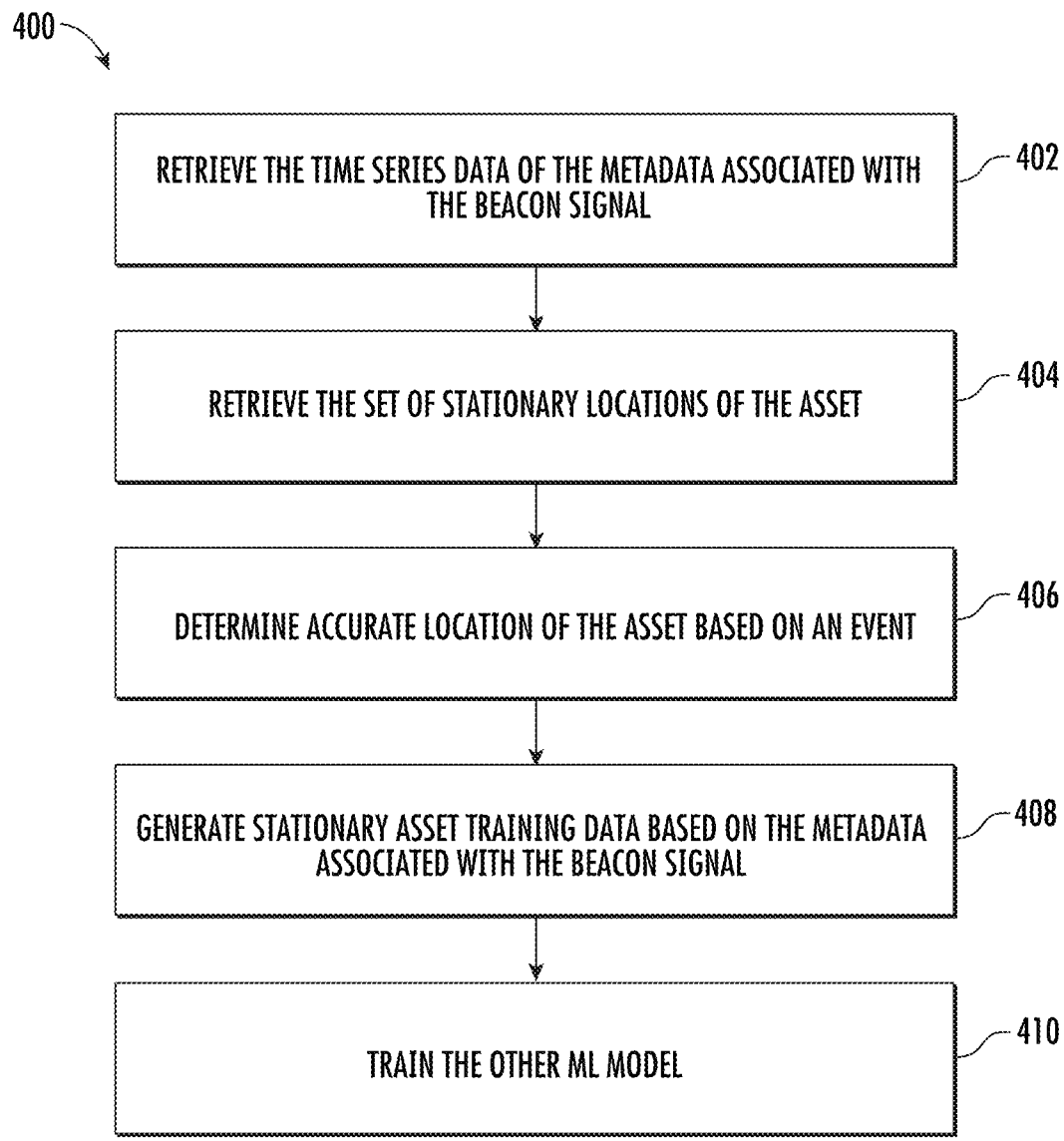
FIG. 4 illustrates a flowchart of a method for training another ML model capable of predicting accurate location of the asset stored in the racks and/or aisle, according to one or more embodiments illustrated herein.

FIG. 4 illustrates a flowchart 400 of a method for training another ML model capable of predicting accurate location of the asset 112 stored in the racks and/or aisle, according to one or more embodiments illustrated herein.

At step 402, the central server 102 may include means such as the processor 202, the I/O device interface unit 206, the location determination unit 208, and/or the like, for retrieving the time series data of the metadata associated with the beacon signal received from the asset 112 (stored in the racks and/or aisle). More particularly, the location determination unit 208 may be configured to retrieve the time series data of the metadata associated with the beacon signal that is used to determine the set of stationary locations of the asset 112 within the material handling environment 100.

At step 404, the central server 102 may include means such as the processor 202, the I/O device interface unit 206, the location determination unit 208, and/or the like, for retrieving the set of stationary locations of the asset 112 (determined in the step X08).

At step 406, the central server 102 may include means such as the processor 202, the I/O device interface unit 206, the location determination unit 208, and/or the like, for determining the accurate location of the asset 112 based on an event. In some examples, the event may comprise the operator scanning a barcode printed on the asset 112 followed by scanning the barcode printed on the aisle on which the asset 112 is positioned and/or stored using the mobile computer 108. Upon scanning of the barcode printed on asset 112 and the aisle 116, the mobile computer 108 may be configured to retrieve the barcode data from the barcode printed on the aisle 116 and the asset 112. The barcode data of the aisle 116 may include a unique identification of the aisle 116. Thereafter, the location determination unit 208 may be configured to retrieve the location of aisle from a look-up table that may include a mapping between the unique identification of the aisle 116 and the corresponding location within the material handling environment 100. Following table illustrates an example look-up table illustrating the mapping between the unique identification of the aisle 116 and the corresponding the location within the material handling environment 100:

TABLE 2

Look-up table illustrating the mapping between the unique identification of the aisle and the corresponding location

| Unique identification of Aisle 116 | Location in the material handling environment 100 |
|---|---|
| Aisle 1 | (x4, y4, z4) |
| Aisle 2 | (x5, y5, z5) |
| Aisle 3 | (x6, y6, z6) |

In some examples, the location determination unit 208 may be configured to consider the location of aisle (identified based on the event) as the accurate location of the asset 112.

At step 408, the central server 102 may include means such as the processor 202, the I/O device interface unit 206, the training unit 210, and/or the like, for generating stationary asset training data based on the metadata associated with the beacon signal (utilized to determine the set of stationary locations), third set of locations of the asset 112, and the set of stationary locations of the asset 112 (determined using the metadata of the beacon signal). More particularly, the training unit 210 may be configured to define the set of stationary locations and the metadata of the beacon signal as the one or more features of the stationary asset training data. Further, the training unit 210 may be configured to define the accurate location of the asset 112 as the one or more labels of the stationary asset training data.

At step 410, the central server 102 may include means such as the processor 202, the I/O device interface unit 206, the training unit 210, and/or the like, for training the other ML model based on the stationary asset training data. In an example embodiment, the training unit 210 may be configured to utilize known methodology to train the other ML model.

Figure 5:
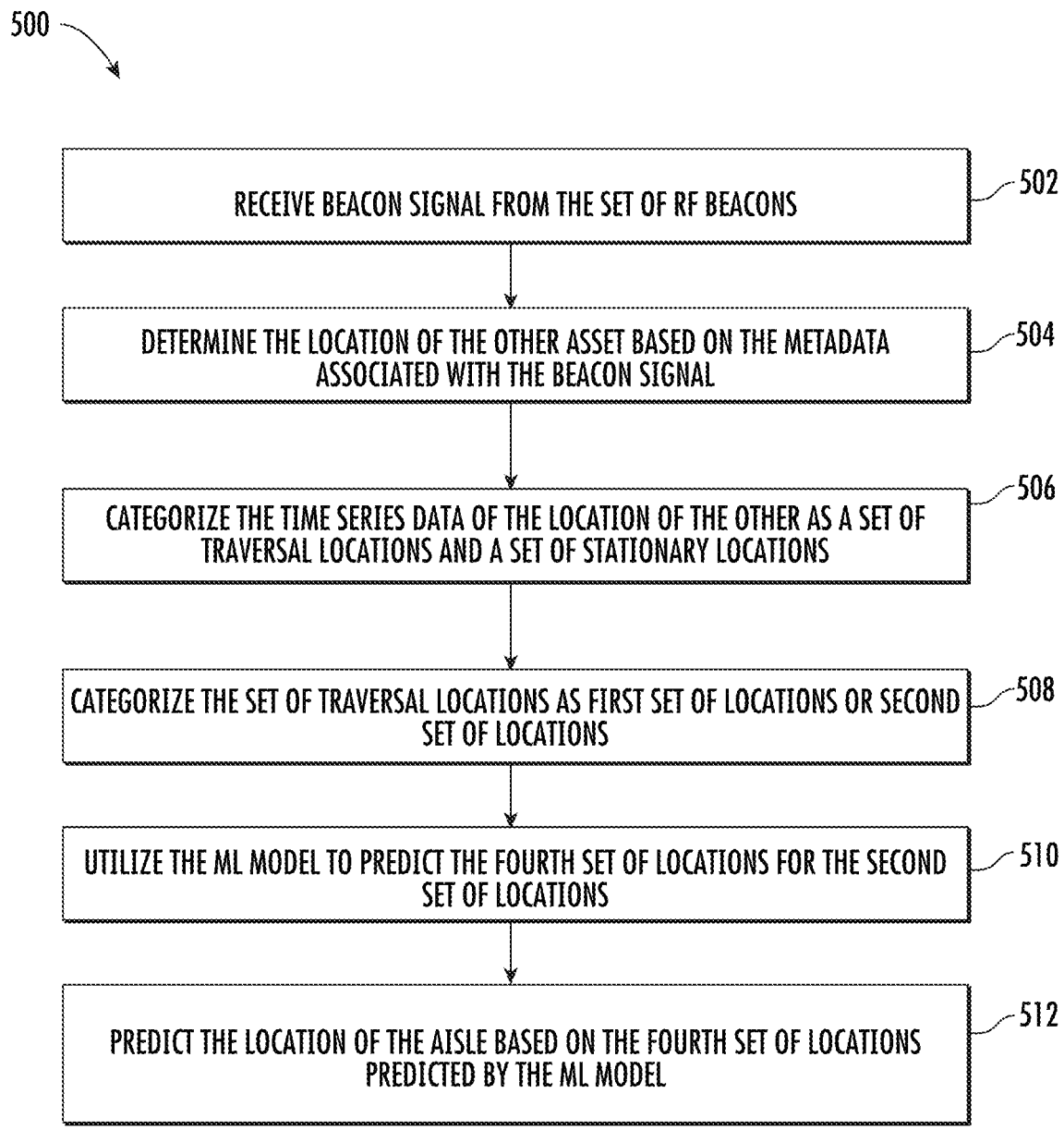
FIG. 5 illustrates a flowchart of a method for predicting the fourth set of locations for another asset within the material handling environment, according to one or more embodiments illustrated herein.

FIG. 5 illustrates a flowchart 500 of a method for predicting the fourth set of locations for another asset within the material handling environment 100, according to one or more embodiments illustrated herein.

At step 502, the central server 102 may include means such as the processor 202, the I/O device interface unit 206, the location determination unit 208, and/or the like, for receiving the beacon signal through the set of RF beacons from another RF tag 106 associated with the other asset. At step 504, the central server 102 may include means such as the processor 202, the I/O device interface unit 206, the location determination unit 208, and/or the like, for determining the location of the other asset based on the metadata associated with the beacon signal, as is described in step 306. Since the processor 202 periodically receives the beacon signal from the other RF tag periodically, the processor 202 generates the time series data of the metadata of the beacon signal, as is described above in the step 302. Accordingly, the location determination unit 208 determines the time series data of the location of the other asset 112.

At step 506, the central server 102 may include means such as the processor 202, the I/O device interface unit 206, the location determination unit 208, and/or the like, for categorizing the time series data of the location of the other asset 112 as the set of traversal locations or the set of stationary locations. In an example embodiment, the location determination unit 208 may be configured to categorize the locations of the other asset using the methodologies described in the step 308. At step 508, the central server 102 may include means such as the processor 202, the I/O device interface unit 206, the location determination unit 208, and/or the like, for further categorizing the set of traversal locations in the first set of locations and the second set of locations, as is described above in step 310. As discussed, the first set of locations correspond to the set of LOS locations, while, the second set of locations correspond to the set of NLOS locations.

At step 510, the central server 102 may include means such as the processor 202, the I/O device interface unit 206, the prediction unit 212, and/or the like, for utilizing the ML model to predict the fourth set of locations for the second set of locations. In some examples, the prediction unit 212 may be configured to provide the second set of locations and the metadata associated with the beacon signals, as the input to the ML model. In response to the input, the ML model predicts the fourth set of locations for the second set of locations. Since the second set of locations are determined in a chronological order, the prediction unit 212 may predict the fourth set of locations in the same chronological order as that of the second set of locations. Accordingly, accurate location in the set of accurate locations have an associated timestamp. Further, the timestamp associated with an accurate location (in the set of accurate locations) is same as the timestamp of the corresponding location in the set of second location.

At step 512, the central server 102 may include means such as the processor 202, the I/O device interface unit 206, the location determination unit 208, the prediction unit 212 and/or the like, for predicting the location of the aisle based on the fourth set of locations predicted by the ML model. The location determination unit 208 may be configured to retrieve an accurate location of the fourth set of locations based on the timestamp associated with each of the fourth set of locations. For example, the location determination unit 208 may be configured to retrieve the accurate location that has chronologically latest timestamp. Thereafter, the based on the accurate location, the location determination unit 208 may be configured to refer to the look-up table (comprising the mapping between the aisle identification and aisle location) to identify an aisle that is closest to the accurate location. Thereafter, the location determination unit 208 may be configured to consider the aisle closest to the accurate location as the aisle on which the asset 112 is placed or stored.

Therefore, the proposed embodiments allow the central server to predict the location of the aisle where the asset 112 has been stored without using additional sensors. For example, the proposed embodiments allow the system to predict aisle location (where the asset 112 is stored) without the need for scanning the barcode printed on the aisle 116. Accordingly, proposed embodiments reduce the steps that are to be performed by the operator and thus increases the productivity of the operations in the material handling environment 100.

Figure 6:
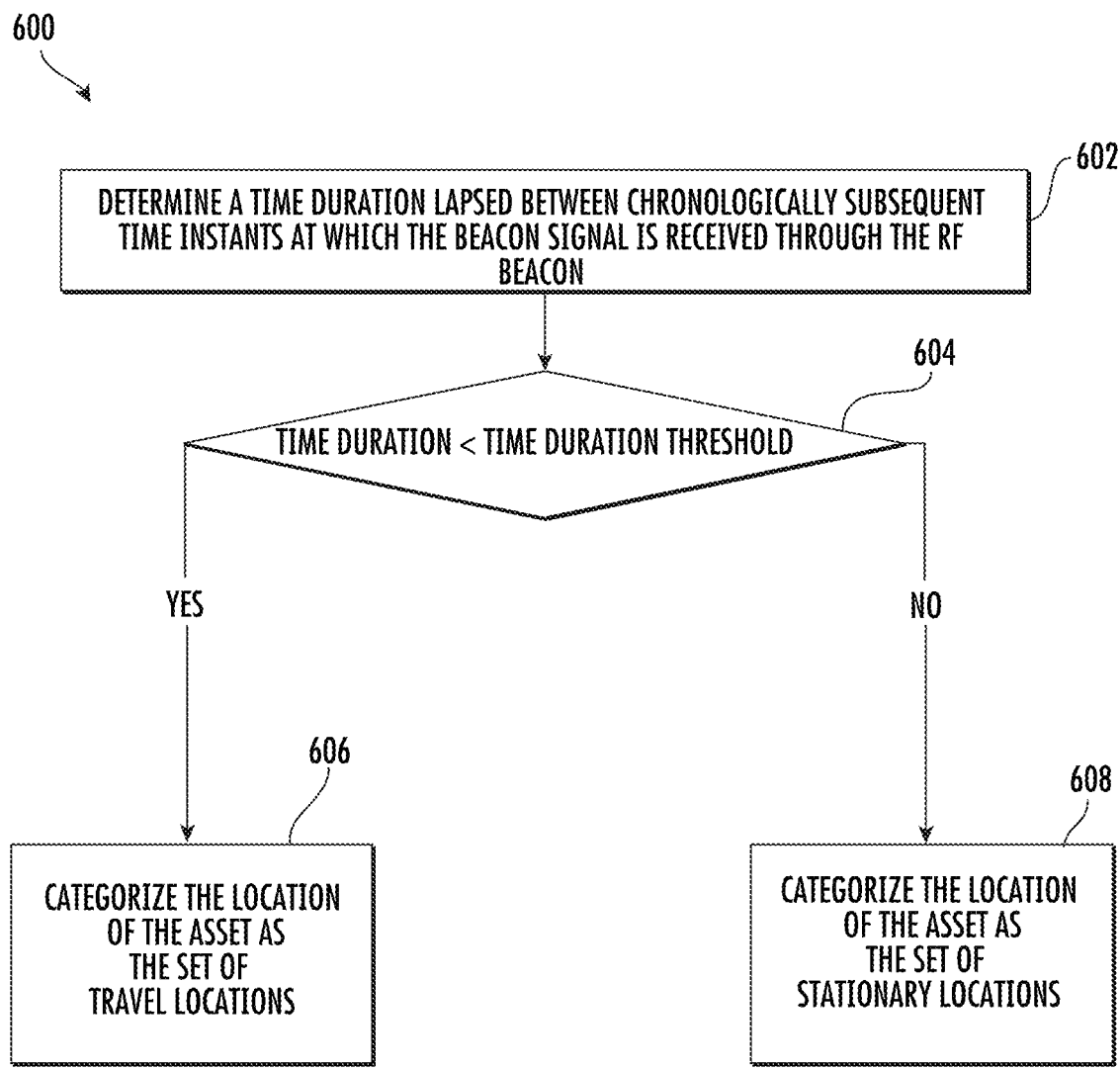
FIG. 6 illustrates a flowchart of a method for categorizing the time series data of the location, according to one or more embodiments illustrated herein.

FIG. 6 illustrates a flowchart 600 of a method for categorizing the time series data of the location, according to one or more embodiments illustrated herein.

At step 602, the central server 102 may include means such as the processor 202, the I/O device interface unit 206, the location determination unit 208, and/or the like, for determining a time duration lapsed between chronologically subsequent time instants at which the beacon signal is received through the RF beacon (in the step of RF beacons). As discussed, the RF tag may periodically transmit the beacon signal to central server. Accordingly, the processor 202 may be configured to determine the time duration lapsed between chronologically subsequent time instants at which the beacon signal is received through the RF beacon (in the step of RF beacons). In another embodiment, the processor 202 may be configured to determine the time duration lapsed between chronologically subsequent time instants at which a RF beacon in the set of RF beacons 104a and 104b receives the beacon signal.

At step 604, the central server 102 may include means such as the processor 202, the I/O device interface unit 206, a location determination unit 208, and/or the like, for determining whether the time duration lapsed is less than a time duration threshold. In an example embodiment, the time duration threshold may be predetermined based on periodicity of the transmission of the beacon signal from the RF tag 106. As discussed, the RF tag 106 transmits the beacon signal more frequently when the RF tag 106 is in motion in comparison to when the RF tag 106 is stationary. The motion of the RF tag 106 is detected based on the readings of the inertial sensors in the RF tag 106.

If the location determination unit 208 determines that the time duration lapsed is less than the time duration threshold, the location determination unit 208 may be configured to perform the step 606. However, if the location determination unit 208 determines that the time duration lapsed is greater than the time duration threshold, the location determination unit 208 may be configured to perform the step 608.

At step 606, the central server 102 may include means such as the processor 202, the I/O device interface unit 206, a location determination unit 208, and/or the like, for categorizing the location of the asset 112, determined using the metadata associated with the beacon signal received at the chronological later time instant, as the set of traversal locations.

At step 608, the central server 102 may include means such as the processor 202, the I/O device interface unit 206, a location determination unit 208, and/or the like, for categorizing the location of the asset 112, determined using the metadata associated with the beacon signal received at the chronological later time instant, as the set of stationary locations.

In some examples, the scope of the disclosure is not limited to categorizing the time series data of the location of the asset 112 based on the time duration lapsed between the reception of the beacon signal. In an example embodiment, the location determination unit 208 may be configured to categorize the time series data based on an event. In some examples, the event may include the operator scanning a barcode printed on the asset 112 followed by scanning the barcode printed on the aisle on which the asset 112 is positioned and/or stored. One such method is described in FIG. 7.

Figure 7:
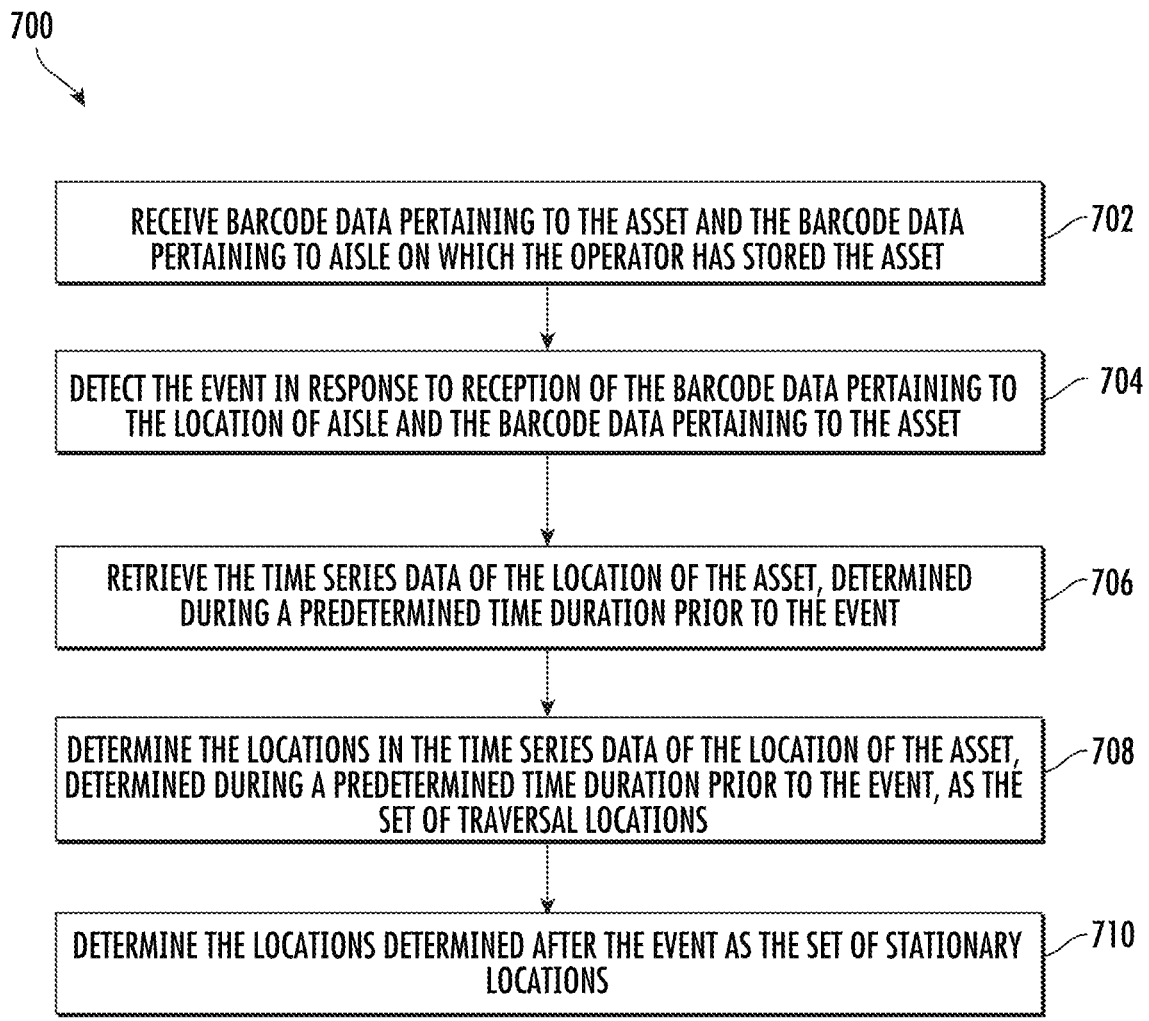
FIG. 7 illustrates a flowchart of a method for categorizing the time series data of the location, according to one or more embodiments illustrated herein.

FIG. 7 illustrates a flowchart 700 of a method for categorizing the time series data of the location, according to one or more embodiments illustrated herein.

At step 702, the central server 102 may include means such as the processor 202, the I/O device interface unit 206, the location determination unit 208, and/or the like, for receiving barcode data pertaining to the asset 112 and the barcode data pertaining to aisle 116 on which the operator has stored the asset 112. In some examples, the processor 202 may be configured to receive the barcode data pertaining to the asset 112 and the barcode data pertaining to aisle 116. In some example, the operator may place the asset 112 on the aisle 116. Thereafter, to indicate to the central server 102 that the task of placing the asset 112 is complete and to record the location where the asset 112 has been placed, the operator may scan the barcode printed on the asset 112 followed by scanning the barcode printed on the aisle 116. The mobile computer 108 may transmit the barcode data pertaining to the asset 112 and the aisle 116 to the central server 102. Further, the central server 102 may correlate the asset 112 with the location of the aisle 116 based on the barcode data pertaining to asset and the aisle.

At step 704, the central server 102 may include means such as the processor 202, the I/O device interface unit 206, the location determination unit 208, and/or the like, for detecting the event in response to reception of the barcode data pertaining to the location of aisle and the barcode data pertaining to the asset 112. At step 706, the central server 102 may include means such as the processor 202, the I/O device interface unit 206, the location determination unit 208, and/or the like, for retrieving the time series data of the location of the asset 112, determined during a predetermined time duration prior to the event. At step 708, the central server 102 may include means such as the processor 202, the I/O device interface unit 206, the location determination unit 208, and/or the like, for determining the locations in the time series data of the location of the asset 112, determined during a predetermined time duration prior to the event, as the set of traversal locations. To this end, it is assumed that the operator may cause the asset 112 to traverse through the material handling environment 100 during the predetermined duration, prior to the event. Accordingly, the locations of the asset 112 during the predetermined duration is considered as the set of traversal locations.

At step 710, the central server 102 may include means such as the processor 202, the I/O device interface unit 206, a location determination unit 208, and/or the like, for determining the locations determined after the event as the set of stationary locations.

In yet another embodiment, the central server 102 may receive data from the one or more inertial sensors in the RF tag 106 along with the beacon signal. Based on the accelerometer data, the location determination unit 208 may be configured to determine whether the RF tag 106 is in motion. Accordingly, the location determination unit 208 may be configured to categorize the location (determined using the metadata of the received beacon signal) as the set of traversal location or the set of stationary location.

Figure 8:
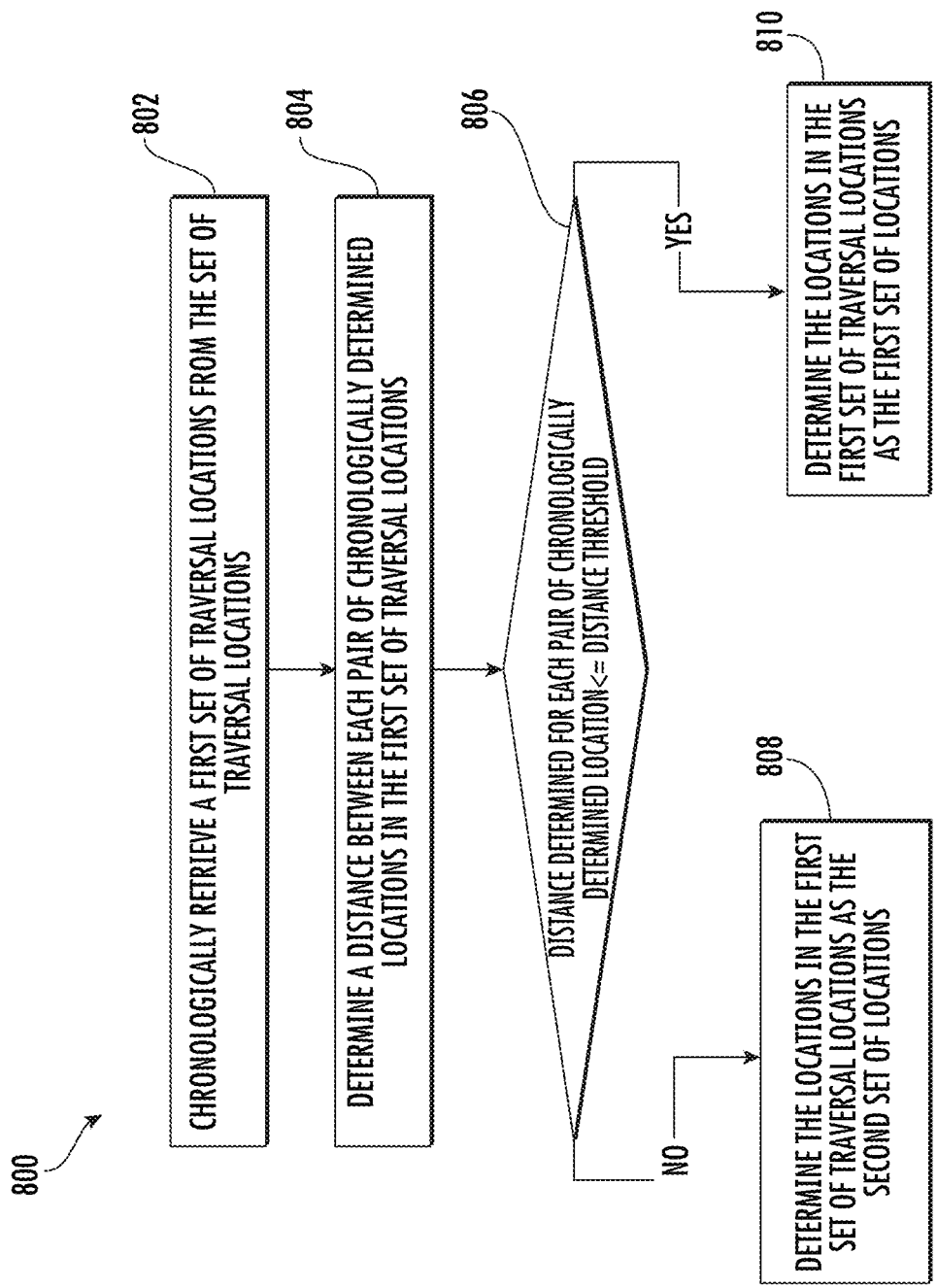
FIG. 8 illustrates a flowchart of a method for categorizing the set of traversal locations in the first set of locations and the second set of locations, according to one or more embodiments illustrated herein.

FIG. 8 illustrates a flowchart 800 of a method for categorizing the set of traversal locations in the first set of locations and the second set of locations, according to one or more embodiments illustrated herein.

At step 802, the central server 102 may include means such as the processor 202, the I/O device interface unit 206, the location determination unit 208, and/or the like, for chronologically retrieving a first set of traversal locations from the set of traversal locations. In some examples, the first set of traversal locations may include locations determined during a first time period within the predetermined duration.

At step 804, the central server 102 may include means such as the processor 202, the I/O device interface unit 206, the location determination unit 208, and/or the like, for determining a distance between each pair of chronologically determined locations in the first set of traversal locations. For example, the first set of traversal locations includes the locations L1, L2, L3, L4, determined at time instants T1, T2, T3, and T4, respectively. To this end, the location determination unit 208 may be configured to determine the distance between L1 and L2, the distance between L2 and L3, and the distance between L3 and L4.

At step 806, the central server 102 may include means such as the processor 202, the I/O device interface unit 206, a location determination unit 208, and/or the like, for determining whether the distance determined for each pair of chronologically determined location is within a distance threshold. If the location determination unit 208 determines that the distance between at one pair of chronologically determined distance is greater than the distance threshold, the location determination unit 208 may be configured to perform the step 808. However, if the location determination unit 208 determines that the distance between each pair of chronologically determined distance is within the distance threshold, the location determination unit 208 may be configured to perform the step 810.

At step 808, the central server 102 may include means such as the processor 202, the I/O device interface unit 206, the location determination unit 208, and/or the like, for determining the locations in the first set of traversal locations as the second set of locations. At step 810, the central server 102 may include means such as the processor 202, the I/O device interface unit 206, the location determination unit 208, and/or the like, for determining the locations in the first set of traversal locations as the first set of locations.

Figure 9:
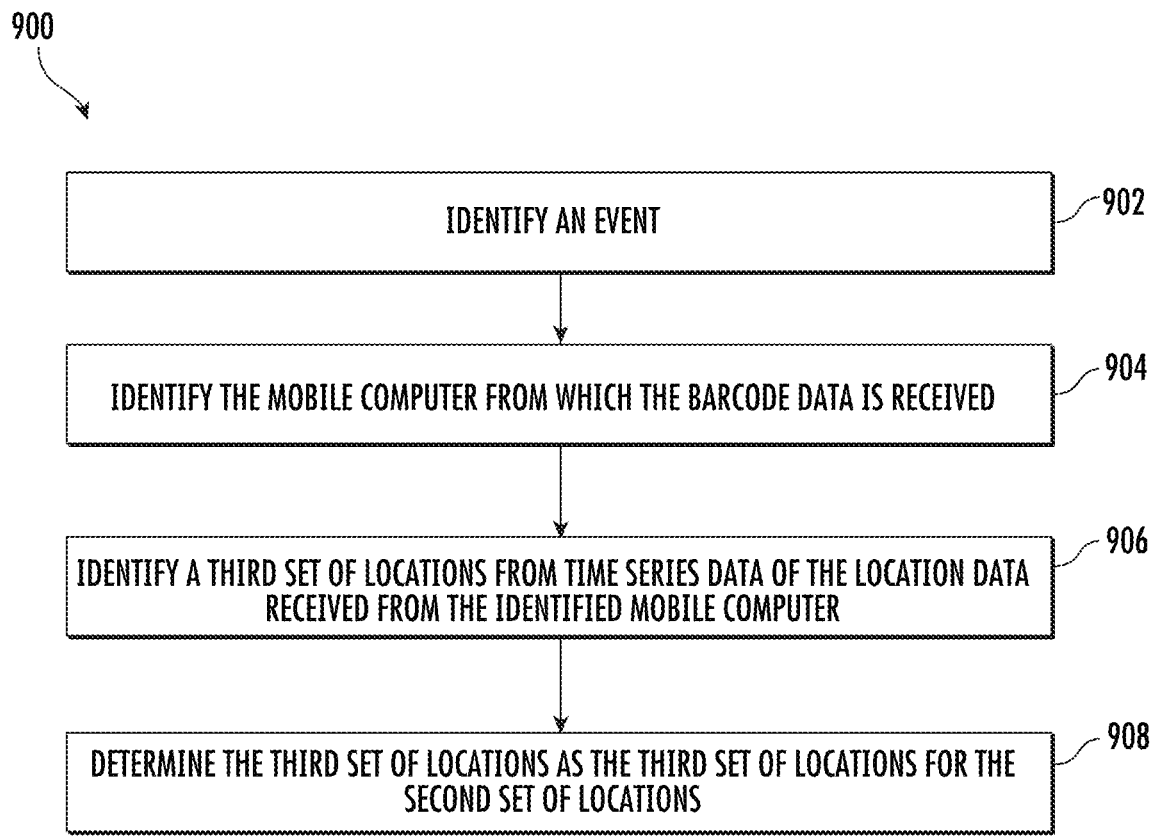
FIG. 9 illustrates a flowchart of a method for determining third set of locations for the second set of locations, according to one or more embodiments illustrated herein.

FIG. 9 illustrates a flowchart 900 of a method for determining third set of locations for the second set of locations, according to one or more embodiments illustrated herein.

At step 902, the central server 102 may include means such as the processor 202, the I/O device interface unit 206, the location determination unit 208, and/or the like, for identifying the event. As discussed, the event corresponds reception of the barcode data pertaining to the asset 112 and/or the aisle at which the asset 112 is stored. At step 904, the central server 102 may include means such as the processor 202, the I/O device interface unit 206, the location determination unit 208, and/or the like, for identifying the mobile computer 108 from which the barcode data is received. In some examples, the processor 202 may be configured to identify the mobile computer 108 based on the metadata associated with data packet (that includes the barcode data) received by the central server. In some examples, the data packet may include details pertaining to MAC address of the mobile computer 108 and/or IP address of the mobile computer 108. The processor 202 may be configured to consider the mobile computer 108 to be associated with the asset 112.

At step 906, the central server 102 may include means such as the processor 202, the I/O device interface unit 206, the location determination unit 208, and/or the like, for identifying a third set of locations from time series data of the location data received from the identified mobile computer 108. The location determination unit 208 may determine the third set of locations based on the timestamp associated with the time series data of the location data of the mobile computer 108, and the timestamp associated with the second set of locations. For example, the location determination unit 208 may be configured to retrieve the third set of locations from the time series data of the location data (received from the mobile computer 108) that have timestamp same as the timestamp of the second set of locations. In another embodiment, the location determination unit 208 may be configured to retrieve the third set of locations from the time series data of the location data (received from the mobile computer 108) that have timestamp within a predefined time range of the timestamp of the second set of locations. The predefined time range may be defined during configuration of the central server.

At step 908, the central server 102 may include means such as the processor 202, the I/O device interface unit 206, the location determination unit 208, and/or the like, for determining the third set of locations as the third set of locations for the second set of locations.

In some examples, the scope of the disclosure is not limited to using the mobile computer 108 to determine the third set of locations for the second set of locations. In an example embodiment, the location determination unit 208 may be configured to utilize the location of the machine 114 causing the traversal of the asset 112 to determine the third set of locations for the second set of locations. As discussed, the machine 114 includes the inertial sensors and/or GPS sensor that is used to generate location data of the machine 114. Using the methodology described in FIG. 9, the location determination unit may be configured to retrieve the third set of locations from the time series data of the location data of the machine 114. Further, as discussed, the third set of locations corresponds accurate location for the second set of locations.

Figure 10:
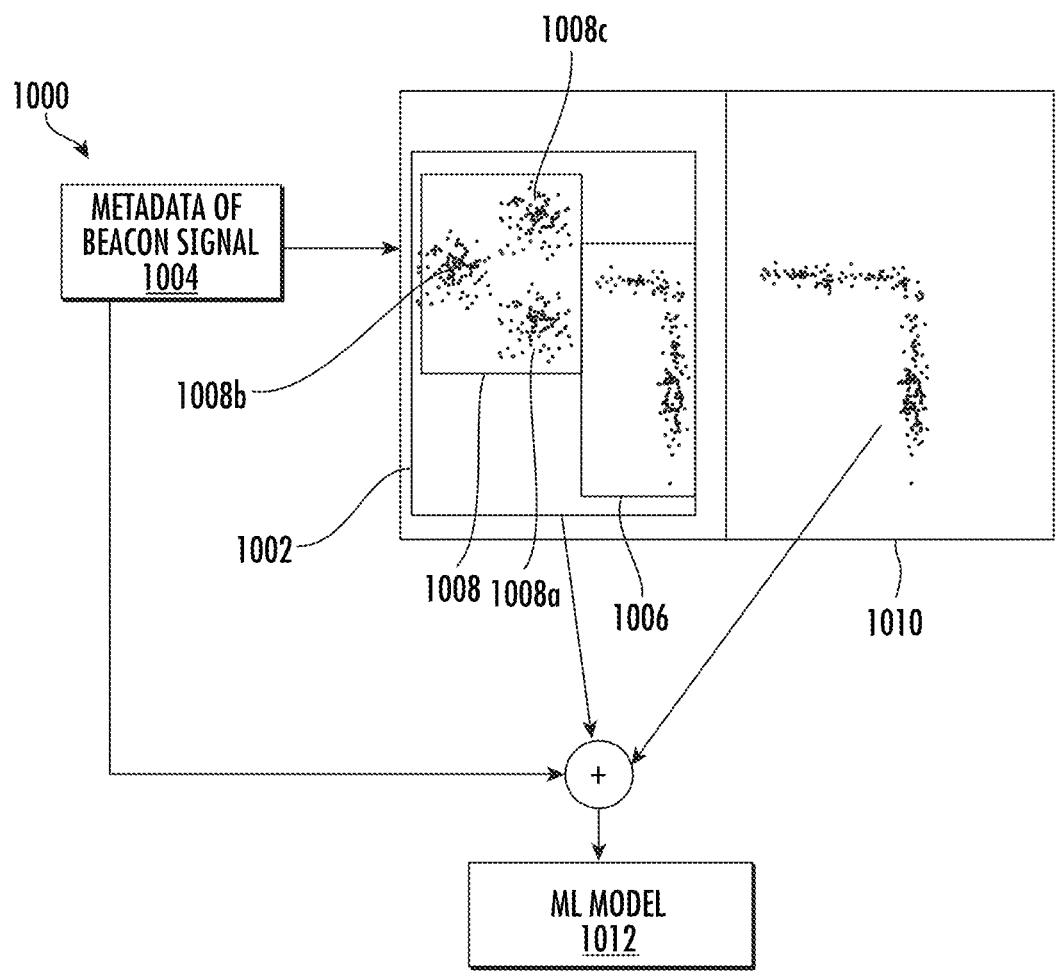
FIG. 10 illustrates an example scenario to train the ML model, according to one or more embodiments described herein.

FIG. 10 illustrates an example scenario 1000 to train the ML model, according to one or more embodiments described herein.

The example scenario 1000 depicts the time series data of the location 1002 of the asset 112 determined based on the metadata of the beacon signal (depicted by 1004) received by the central server through the set of the RF beacons. It can be observed that the time series data of the location 1002 of the asset 112 includes a first set of locations 1006 and the second set of locations 1008. To this end, the second set of locations 1008 has one or more clusters 1008a, 1008b, and 1008c, of the locations since the beacons signal gets reflected of the one or more surfaces in proximity to the asset 112. Accordingly, the example scenario 1000 depicts that the second set of locations includes uncalibrated locations. Additionally, the example scenario 1000 illustrates the time series of the location data obtained from the mobile computer 108 and/or the machine 114 (depicted by 1010). As discussed, the location data obtained from the mobile computer 108 and/or machine 114 includes the third set of locations for the second set of locations.

In an example embodiment, the training unit 210 may be configured to utilize the set of accurate locations, the second set of locations, and the metadata associated with the beacon signal to train the ML model 1012.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

It is noted that each block of the flowchart, and combinations of blocks in the flowchart, may be implemented by various means such as hardware, firmware, circuitry and/or other devices associated with execution of software including one or more computer program instructions. For example, one or more of the procedures described above may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

What is claimed is:

1. A method for tracking assets, the method comprising:
determining, by a processor, one or more locations of an asset within an indoor environment based on metadata associated with a radio frequency (RF) signal received from a RF tag associated with the asset;
identifying, by the processor, a first set of locations of the one or more locations, wherein the first set of locations correspond to calibrated locations of the asset in which the RF tag on the asset is within a Line of Sight (LOS) of a RF beacon installed in the indoor environment;
identifying, by the processor, a second set of locations of the one or more locations, wherein the second set of locations corresponds to uncalibrated locations of the asset in which the RF tag on the asset is out of the LOS of the RF beacon within the indoor environment;
determining, by the processor, a third set of locations of the asset that are calibrated locations for the second set of locations based on association of a second timestamp associated with the second set of locations and a first timestamp associated with time series data of location data received from one of: a mobile computer and a machine, wherein the third set of locations is identified from the time series data of the location data such that the first timestamp associated with the third set of locations is the same as that of the second timestamp associated with the second set of locations; and
training, by the processor, a machine learning (ML) model based on the first set of locations, the second set of locations, the third set of locations, and the metadata associated with the RF signal, wherein the ML model is configured to predict a fourth set of locations of another asset within the indoor environment.

2. The method of claim 1 further comprising determining, by the processor, one or more locations of an other asset within the indoor environment.

3. The method of claim 2, wherein the one or more locations of the other asset comprises the first set of locations that correspond to calibrated locations of the other asset in the indoor environment, and the second set of locations, wherein the second set of locations includes uncalibrated locations of the other asset in the indoor environment.

4. The method of claim 3, wherein the fourth set of locations correspond to calibrated locations of the other asset for the second set of locations of the other asset.

5. The method of claim 1 further comprising categorizing, by the processor, the one or more locations of the asset as a set of traversal locations or a set of stationary locations based on a periodicity of reception of the RF signal from the RF tag.

6. The method of claim 5, wherein the first set of locations and the second set of locations of the asset are identified from the set of traversal locations of the asset.

7. The method of claim 1 further comprising receiving, by the processor, accelerometer data from the RF tag.

8. The method of claim 7 further comprising categorizing, by the processor, the one or more locations of the asset as a set of traversal locations or a set of stationary locations based on the accelerometer data.

9. The method of claim 1 further comprising receiving an input corresponding to scanning a barcode on the asset.

10. The method of claim 9 further comprising determining the one or more locations of the asset based on the metadata associated with the RF signal received, from the RF tag on the asset, during a predetermined time period prior to a first time instant.

11. A central server for tracking assets, the central server comprising:
a processor;
a memory device communicatively coupled to the processor, the memory device comprising a set of instructions executable by the processor to:
determine one or more locations of an asset within an indoor environment based on metadata associated with a radio frequency (RF) signal received from a RF tag associated with the asset;
identify a first set of locations of the one or more locations, wherein the first set of locations correspond to locations within the indoor environment where the RF tag on the asset is within a Line of Sight (LOS) of a RF beacon installed in the indoor environment;
identify a second set of locations of the one or more locations, wherein the second set of locations corresponds to locations within the indoor environment where the RF tag on the asset is out of the LOS of the RF beacon, wherein the second set of locations correspond to uncalibrated locations of the RF tag within the indoor environment;
determine a third set of locations of the asset within the indoor environment based on association of timestamp associated with the second set of locations and timestamp associated with time series data of a location data received from one of: a mobile computer and a machine, wherein the third set of locations correspond to calibrated locations for the second set of locations, wherein a first timestamp associated with the second set of locations is the same as a second timestamp associated with the time series data of the location data; and
train a machine learning (ML) model based on the first set of locations, the second set of locations, the third set of locations, and the metadata associated with the ML model, wherein the ML model is configured to predict a fourth set of locations of another asset within the indoor environment when another RF tag on the another asset is out of the LOS of the RF beacon.

12. The central server of claim 11, wherein the processor is further configured to determine one or more locations of an other asset within the indoor environment.

13. The central server of claim 12, wherein the one or more locations of the other asset comprises the first set of locations that correspond to the calibrated locations of the other asset in the indoor environment, and the second set of locations, wherein the second set of locations includes uncalibrated locations of the other asset in the indoor environment.

14. The central server of claim 13, wherein the fourth set of locations correspond to calibrated locations of the other asset for the second set of locations of the other asset.

15. The central server of claim 11, wherein the processor is further configured to categorize the one or more locations of the asset as a set of traversal locations or a set of stationary locations based on a periodicity of reception of the RF signal from the RF tag.

16. The central server of claim 15, wherein the first set of locations of the asset and the second set of locations of the asset are identified from the set of traversal locations of the asset.

17. The central server of claim 11, wherein the processor is further configured to receive accelerometer data from the RF tag.

18. The central server of claim 17, wherein the processor is further configured to categorize the one or more locations of the asset as a set of traversal locations or a set of set of stationary locations based on the accelerometer data.

19. The central server of claim 11, wherein the processor is further configured to receive an input corresponding to scanning a barcode on the asset.

20. The central server of claim 19, wherein the processor is further configured to determine the one or more locations of the asset based on the metadata associated with the RF signal received, from the RF tag on the asset, during a predetermined time period prior to a first time instant.

21. A method for tracking assets, the method comprising:
determining, by a processor, one or more locations of an asset within an indoor environment based on metadata associated with a radio frequency (RF) signal received from an RF tag associated with the asset, wherein the one or more locations include a first set of locations and a second set of locations, wherein the first set of locations corresponds to calibrated locations of the asset in which the RF tag on the asset is within a Line of Sight (LOS) of a RF beacon installed in the indoor environment, and wherein the second set of locations corresponds to uncalibrated locations of the asset in which the RF tag on the asset is out of the LOS of the RF beacon within the indoor environment;
predicting, by the processor, a fourth set of locations based on the first set of locations, the second set of locations, and a third set of locations determined based on a location data received from a mobile computer by utilizing a machine learning (ML) model, wherein the third set of locations correspond to the calibrated locations for the second set of locations, wherein a first timestamp associated with the second set of locations is the same as a second timestamp associated with time series data of the location data received from one of: the mobile computer and a machine; and
predicting a location of an aisle where the asset has been stored based on the fourth set of locations.

* * * * *